United States Patent
Bartholomew

[11] 4,026,692
[45] May 31, 1977

[54] PRESS MOLDING OPTICAL ARTICLES FROM ACID HYDRATED GLASSES

[75] Inventor: Roger F. Bartholomew, Painted Post, N.Y.

[73] Assignee: Corning Glass Works, Corning, N.Y.

[22] Filed: Dec. 15, 1975

[21] Appl. No.: 640,735

[52] U.S. Cl. .................... 65/30 R; 65/31; 65/68; 65/DIG. 14; 106/53

[51] Int. Cl.$^2$ .............. C03C 15/00; C03B 9/14

[58] Field of Search ....... 65/30 R, 23, 31, DIG. 14, 65/68; 106/52, 53

[56] References Cited

UNITED STATES PATENTS

| | | | |
|---|---|---|---|
| 3,149,946 | 9/1964 | Elmer | 65/31 X |
| 3,278,285 | 10/1966 | Pickering | 65/68 |
| 3,290,193 | 12/1966 | Salzle | 65/31 X |
| 3,653,864 | 4/1972 | Rothermel et al. | 65/31 X |
| 3,833,347 | 9/1974 | Angle et al. | 65/68 X |
| 3,912,481 | 10/1975 | Bartholomew et al. | 65/30 R |
| 3,938,974 | 2/1976 | Macedu et al. | 65/30 R |

*Primary Examiner*—S. Leon Bashore
*Assistant Examiner*—Frank W. Miga
*Attorney, Agent, or Firm*—James A. Giblin; Clinton S. Janes, Jr.; Clarence R. Patty, Jr.

[57] ABSTRACT

A glass article having relatively high degrees of surface smoothness, durability, and light transmissivity can be made by forming a glass comprising, in mole percent on an oxide basis, 70–80% $SiO_2$, 8–18% $Na_2O$ and/or $K_2O$, and 5 to 10% of $ZnO$ and/or $PbO$; hydrating the glass under acidic conditions to include a water content of up to 12% by weight while reducing the alkali content; reacting the hydrated glass with a HF-containing solution to remove up to 30 weight % of the glass; dehydrating the glass, if necessary, to reduce the total water content to a range of 3 to 7 weight percent; and pressure molding the glass under conditions sufficient to impart an optical quality surface smoothness of a die to the glass surface.

22 Claims, 6 Drawing Figures

PRESS MOLDING OPTICAL ARTICLES FROM ACID HYDRATED GLASSES

RELATED APPLICATION

U.S. patent application Ser. No. 640,733, filed of even date in the name of C. K. Wu, entitled "Optical Articles Prepared from Hydrated Glasses," and assigned to the present assignee.

BACKGROUND OF THE INVENTION

Field

This disclosure relates generally to the field of hydrated glass materials and specifically to a method of forming an optical quality article from such materials.

The manufacture of glass articles useful for fine optical applications and having good durability, light transmissivity, and surface smoothness commonly requires at least three basic steps. Firstly, a base glass is formed from selected ingredients via conventional glass forming techniques. Secondly, the glass surface is ground to achieve a relatively rough surface having an approximate curvature or degree of flatness. Lastly, that surface is subjected to a polishing step to remove surface imperfections such that, after polishing, there is obtained an optical quality surface smoothness. Typically, to assure surface smoothness of precision optical quality, the surface roughness (Roughness Height) of the glass should not exceed one-tenth of the wavelength of light being transmitted. Since the wavelengths of visible light range from about 16 microinches to 30 microinches, this means that the surface roughness should not exceed about 1.6 microinches in the case of violet light and 3.0 in the case of red light.

The relative surface smoothness (or low degrees of surface roughness) of an article can be precisely measured by known means. For example, in one method, the surface characteristics of an article are measured with an instrument which amplifies and displays the displacement of a stylus-like arm which is slowly drawn across the surface of the article. The results can be viewed on a chart as an actual reproduction of the surface being examined, amplified as high as 100,000 times. Alternatively, the results can be described in terms of "Roughness Height." This expression, for purposes of defining a standard, is described as the arithmetical average (AA) deviation expressed in microinches measured normal to the centerline. Arithmetic Average (AA) is also known in British Standards as Center Line Average (CLA). This terminology is explained more fully in the publication, Surface Texture, ASA B 46.1 — 1962, published by the American Society of Mechanical Engineers, New York, N.Y. Typical of the instruments which can measure fine degrees of surface smoothness (peaks and valleys) are instruments known commercially as a Proficorder or a Surfanalyzer. Detailed descriptions concerning the use of such instruments can be found in manuals used with the instruments and other publications. According to one such manual which accompanies the Gould Surfanalyzer, Model 1200, the results of surface measurement, expressed in AA, can be converted approximately to the root mean square (rms) average by multiplying the AA by 1.11. Hence, surface smoothness, or a low degree of surface roughness, can be expressed in AA units or rms units over a given surface. An example of rms measurements is described in an article entitled "Polishing of Supersmooth Metal Mirrors," Applied Optics, Vol. 14, No. 8, pp. 1808–1812, Aug. 1975. See also an article entitled "Surface Characterization: A Total Approach," Research/Development, Nov. 1975 which describes the use of stylus instruments.

As used herein, the expression "optical quality surface" or its equivalent, refers to a glass surface having a Roughness Height the AA of which is less than 3.0 microinches over a surface distance of at least 0.1 inch. A preferred optical quality surface has a Roughness Height the AA of which is less than 1.6 microinches over a surface distance of at least 0.1 inch, so that the entire range (16 to 30) of visible light can pass on or through the surface with minimal diffusion or scattering.

In addition to a high degree of surface smoothness, optical glass articles such as lenses should meet minimum standards for durability and light transmissivity. One common test for chemical durability of an optical glass lens is known as American Optical Stability Test 5.2.0.0.6. which measures durability by noting the mg/cm$^2$ of glass lost after a defined exposure to a defined acid environment. An acceptable "standard" of durability is achieved if the amount of glass loss is less than 0.05 mg/cm$^2$ under the test conditions.

Visible light transmissivity can be measured by determining the percentages of selected wavelengths of visible light (e.g. 350, 400, 500, and 700 nm) which pass through a tested glass article under defined conditions. A common method for determining such light transmission involves the use of visible spectroscopy.

The present invention is concerned with a method of making an optical glass article which has a high degree of surface smoothness durability and light transmissivity. The method is unique in that costly and time consuming grinding and polishing steps are not used.

Prior Art

Glass materials conventionally used in the preparation of fine optical articles cannot be readily molded by known molding techniques to achieve an optical quality surface. In recent years, however, it has been found that certain glass compositions can be successfully hydrated to achieve rubbery or plastic-like properties. Such glasses have become known as hydrated glasses because they include varying amounts of water within the glass. See, for example, U.S. Pat. No. 3,498,802 and U.S. Pat. No. 3,498,803 which disclose methods of including water within certain types of glass to impart properties not commonly associated with glass per se. See also U.S. Pat. No. 3,811,853 which discloses the hydration of such glasses under acidic conditions. More recently, in U.S. Pat. No. 3,912,481, issued in the names of R. Bartholomew et al., on Oct. 14, 1975, it has been disclosed that glass articles can be thermoplastically formed at relatively low temperatures by forming such glasses in a two-step process. In the first step, excess water is introduced into a base anhydrous glass. Then, the water content is reduced to a defined range via a partial dehydration step.

In preparing hydrated glasses, it has been noted that to facilitate hydration, a minimum amount of alkali must be present as a glass constituent. The presence of alkali also permits hydration with less water. Commonly however, the presence of such alkali ($Na_2O$ and/or $K_2O$, for example) results in less than desired final durability of the hydrated product. To achieve an acceptable durability, it has been found that an acidic hydration step can be utilized to effectively reduce the total alkali content. However, in hydrating the glass under acidic conditions, it has been found that undesirable alkali gradients result in the glass (e.g., the alkali content varies from the surface to the center of the final article). Hence, this disadvantage has tended to nullify the overall advantages of an acid hydration step. I have now found a method of preparing a moldable glass article via an acidic hydration step without that disadvantage. Details of my method are described below.

SUMMARY OF THE INVENTION

The method of making an optical glass article having an optical quality surface smoothness, durability, and light transmissivity comprises the steps of forming an anhydrous base glass comprising, in mole percent on the oxide basis, 70–80% $SiO_2$, 8–18% $Na_2O/K_2O$, and 5–10% of a member selected from ZnO, PbO, and a mixture thereof; hydrating the glass under acidic conditions to include a water content of up to 12 weight percent while reducing the alkali content; reacting the hydrated glass with an HF-containing solution under conditions sufficient to remove up to 30 weight percent of the glass; dehydrating the glass, if necessary, to reduce the water content to a range of 3 to 7 weight percent; and, then pressure molding the glass under conditions sufficient to impart to the glass surface an optical quality surface smoothness by using a die having such surface. In preferred embodiments, the anhydrous glass may include up to 5 mole % $Al_2O_3$, up to 3 mole % $B_2O_3$ and/or $P_2O_5$, and up to 5 mole % of BaO, MgO, SrO, or mixtures thereof.

SPECIFIC EMBODIMENTS

Figure 1:
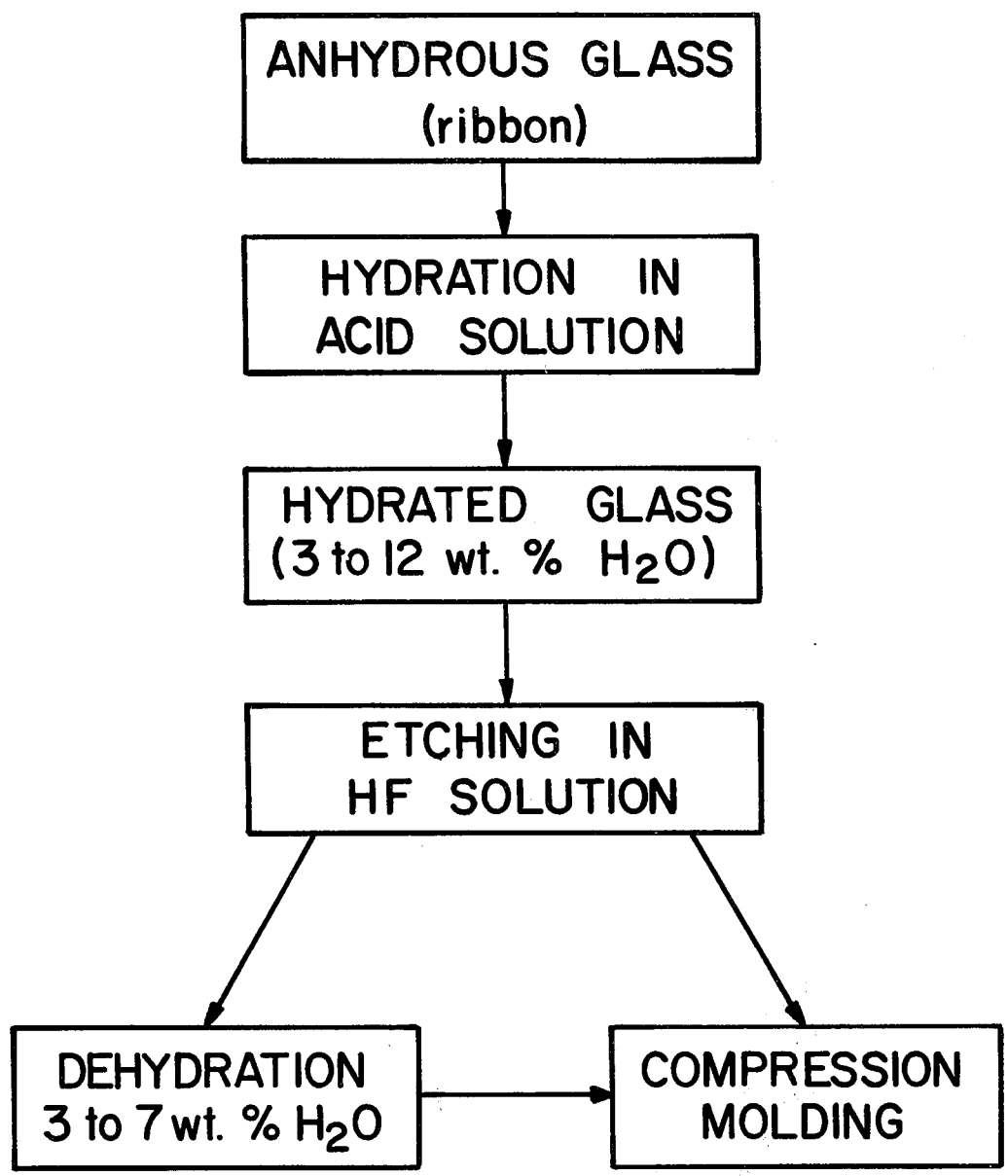
FIG. 1 is a flow chart illustrating the overall process.

The overall process of this disclosure and a modification is shown in the flow chart of FIG. 1. In the flow chart, it can be seen that the first step involves forming a base anhydrous glass. For hydration, molding, durability, and light transmissivity purposes, the base glass composition should consist of about 70 to 80 mole % $SiO_2$, 8 to 18% $Na_2O$ and/or $K_2O$, and about 5 to 10% ZnO and/or PbO. The base glass can be formed by conventional glass forming techniques and may include minor amounts of various additives commonly used in glassmaking to achieve a given effect or to aid in forming. In various preferred embodiments, up to 5 mole % $Al_2O_3$, up to 3% $B_2O_3/P_2O_5$, and/or up to 5% of BaO, MgO, SrO, or mixtures thereof may be used. In a very preferred embodiment about 1 to 2 mole % $Al_2O_3$ is used. Since the glass is ultimately subjected to a pressure molding step, the initial form of the base glass can be varied; e.g. glass ribbon, discs, granules, etc. Generally, any shape which can be subjected to a molding step may be used. However, because of the hydration, etching and dehydration steps required, it has been found convenient to use base anhydrous glass in the form of thin ribbon and/or discs or in the form of small particles. By providing a relatively small or thin base glass, the hydration and etching periods are kept to a practical minimum, an obvious advantage for any commercial applications.

Figure 2:
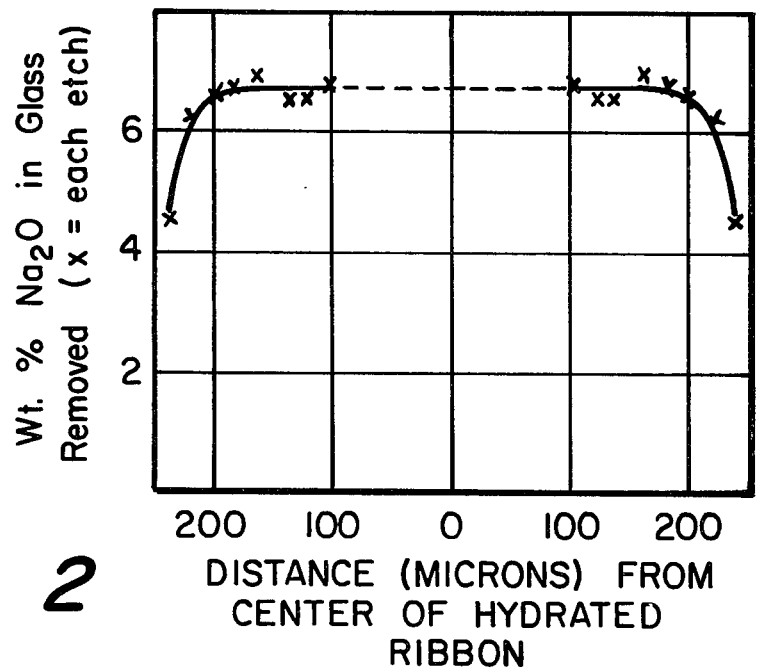
FIG. 2 is a graph illustrating variation of alkali concentration of a sample vis-a-vis sample depth.
Figure 3:
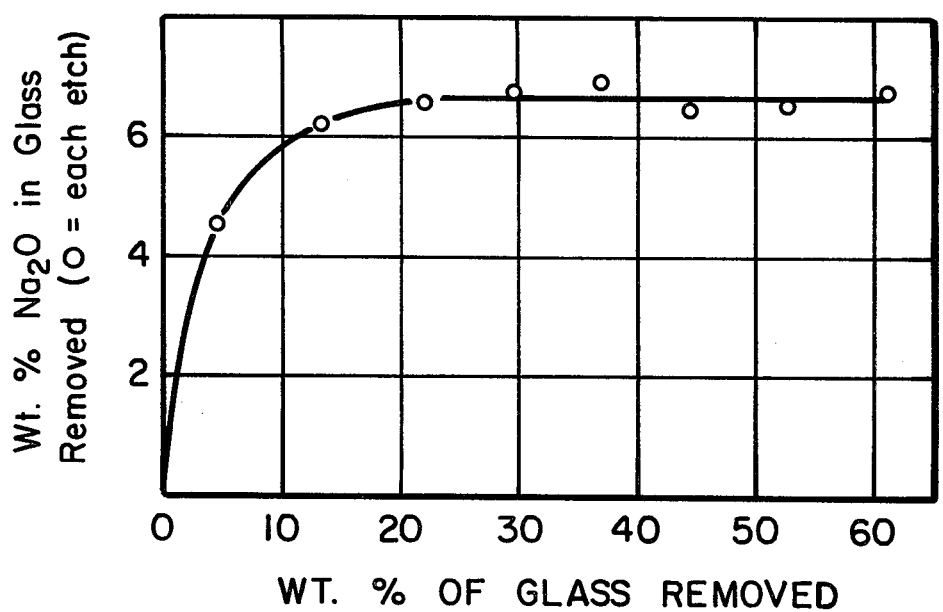
FIG. 3 is a graph illustrating the amounts of alkali removed with various etchings as a function of total glass removed.

After the base glass has been formed, it is acid hydrated (pH<4.0) by known means to 3% to 12% by weight water. Then the hydrated glass is reacted with an HF-containing solution, preferably also containing equal volumes of $H_2SO_4$ or $HNO_3$, to remove up to 30 wt.% of the glass and all alkali gradients. Then the etched glass is dehydrated by known means to reduce the total water content to 3 to 7 wt.%. The above steps eliminates the so-called alkali gradient, thus not only enhancing durability, but also permitting the subsequent homogeneous molding step with a plurality of particles or discs, the outer surfaces of which are compacted against one another during the molding process. The presence of the alkali gradient in a piece of hydrated glass ribbon (described more fully below) is illustrated in the curves of FIGS. 2 and 3. Preferably, the etching step is in an aqueous solution of at least 5 molar HF and at least 5 molar $H_2SO_4$ and/or $HNO_3$.

Although the exact etching conditions will depend on HF solution strength and other factors such as temperature, sample thickness, etc., it is thought that the conditions required to remove up to 30 weight percent of the sample and/or remove the alkali gradient, can be readily determined by one skilled in the art. A preferred operating example is given below.

Figure 4:
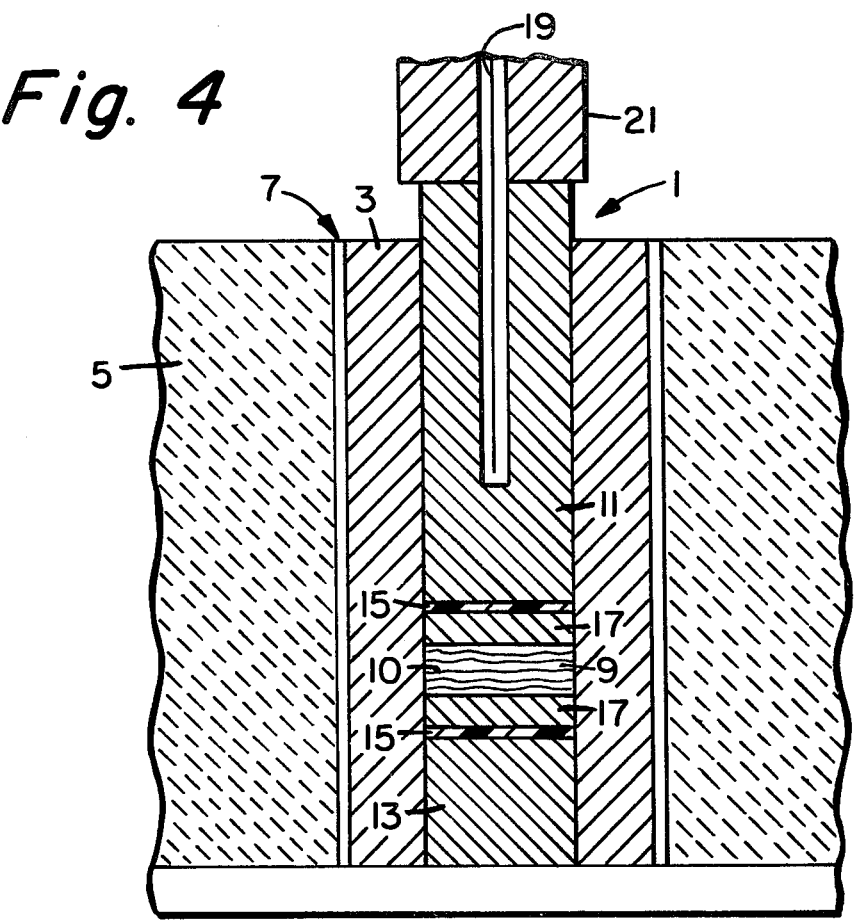
FIG. 4 illustrates the compression mold used to make a glass lens.
Figure 5:
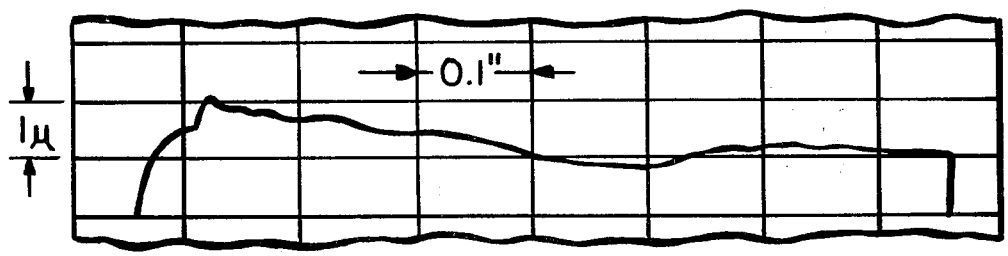
FIG. 5 is a reproduction of a surface smoothness recording of a die used to mold a glass lens.
Figure 6:
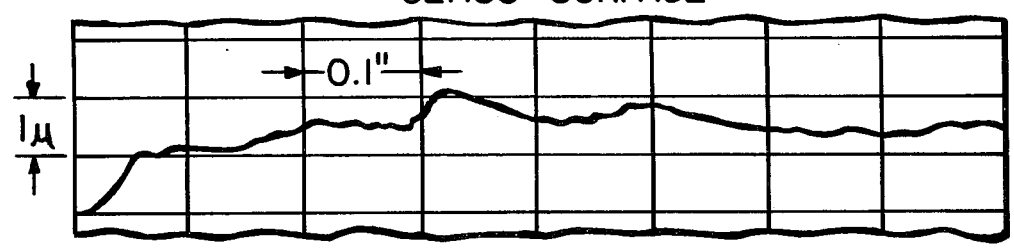
FIG. 6 is a reproduction of a surface smoothness recording of a glass lens made with the mold of FIG. 4 and the die surface represented by FIG. 5.

After the etching step and, if needed, the dehydration step, the glass is placed in a mold of the type illustrated in FIG. 4 and pressure molded by conventional techniques at a temperature ranging from about 250° to 450° C. and a pressure ranging from about 5,000 to 13,000 psi. In the example below, the preferred molding conditions were at 350° to 425° C. and about 7,000 to 10,000 psi, and the mold consisted of a tungsten carbide disc (25.4 mm × 4 mm) having a polished surface of optical quality. A surface analysis trace of the surface is shown in FIG. 5. FIG. 6 shows a similar trace of a glass disc (25.4 mm × 2 mm) made by placing several (5) discs of the etched ribbon (dehydrated) of the examples below in the mold.

DEMONSTRATION OF ALKALI GRADIENT IN ACID HYDRATED GLASS

In one example below, a preferred glass composition (95QNS) was used although the method is applicable to any ZnO and/or PbO-containing alkali silicate glass described above. A very preferred composition (base glass) comprised starting ingredients by mole on the oxide basis, 77.1% $SiO_2$, 10.8% $Na_2O$, 3.0% $K_2O$, 7.8% ZnO, and 1.3% $Al_2O_3$. A 200 lb. melt of the above ingredients was made by conventional means and drawn into a ribbon form. The ribbon was about 1 inch wide and 0.015 inch thick. Several pieces of this ribbon, each about 4 inches long, were initially hydrated in an autoclave for 16 hours at 270° C. and 700 psi in an acidic $Pb(NO_3)_2/HNO_3$ solution consisting of 25g $Pb(NO_3)_2$ in 100 ml $H_2O$ to which was added 1 ml of concentrated $HNO_3$.

This material was then etched in the $HF/H_2SO_4$ solution described below to remove 9% of the total weight (1st etch). The chemical composition of the glass dissolved in this portion was then obtained by analysis of the etch solution. The sample was then further etched (2nd etch) so as to loose 42% (wt.) of the original weight. The remaining sample (58% of original) was then analyzed. The data are shown in Table I below.

TABLE I

| Oxide | Analysis of Remaining Solution After 1st Etch | | | Analysis of Glass Bulk After 2nd Etch | | | Anhydrous | |
|---|---|---|---|---|---|---|---|---|
| | Wt% Analysis | Dry Basis | moles $SiO_2=1$ | Wt% Analysis | Dry Basis | moles $SiO_2=1$ | Wt% Analysis | moles $(SiO_2=1)$ |
| $SiO_2$ | 71.2 | 79.2 | 1.0000 | 67.3 | 75.8 | 1.0000 | 74 | 1.0000 |
| $Na_2O$ | 4.89 | 5.44 | 0.0666 | 7.34 | 8.27 | 0.1057 | 10.3 | 0.1350 |
| $K_2O$ | 3.28 | 3.65 | 0.0294 | 3.84 | 4.33 | 0.0364 | 4.55 | 0.0392 |
| ZnO | 8.58 | 9.54 | 0.0889 | 8.26 | 9.31 | 0.0907 | 9.13 | 0.0911 |
| $Al_2O_3$ | (2.0) | (2.2) | 0.0164 | (2.0) | (2.20) | 0.0171 | 2.15 | 0.0171 |
| $H_2O$ | 11.03 | 0.0 | | 11.03 | | | | |
| Total | 100.98 | 100.03 | | 99.77 | 99.91 | | 100.13 | |

( ) Approximate analysis

The data of Table I illustrate that about one in four of the sodium ions is removed during the acidic hydration. The third and last columns show there is no significant change in the ZnO or $Al_2O_3$ to $SiO_2$ ratio, but a change in the $K_2O$ to $SiO_2$ ratio. However, because the $Na_2O$ is the component which is most likely to cause a significant concentration gradient, its chemical profile was obtained by etching off layers of about 20 microns of a second piece of acid hydrated ribbon. The ribbon was hydrated under conditions identical to the first sample. The $Na_2O$ content of the glass in the etch segments was determined by analysis. These data are shown in Table II. The sample became too thin to make any further etches. FIG. 2 shown the concentration-distance from the center of the ribbon profile, and FIG. 3 shows the weight % of $Na_2O$ in the glass in each etch step as a function of weight % removal.

TABLE II

Chemical Profile of Acid Hydrated 95QNS Glass

| Wt% $Na_2O$ | Depth removed- accumulated- microns | Wt in g of sample removed | Wt% of * sample removed |
|---|---|---|---|
| 4.54 | 12 | 0.0403 | 4.8 |
| 6.21 | 33 | 0.0752 | 13.6 |
| 6.59 | 54 | 0.0732 | 22.2 |
| 6.71 | 71 | 0.0592 | 29.3 |
| 6.90 | 88 | 0.0614 | 36.5 |
| 6.49 | 108 | 0.0679 | 46.5 |
| 6.52 | 128 | 0.0696 | 52.7 |
| 6.77 | 149 | 0.0734 | 61.4 |

* Original weight of sample 0.8474g

From FIG. 3 it appears that approximately 20% to 25% weight removed by HF etch leaves a hydrated material with no significant $Na_2O$ concentration gradient. Because the change in $K_2O$ is at least one order of magnitude lower than $Na_2O$ it can safely be assumed that a similar finding would hold for that component.

A conclusion to be drawn from the above results is that acid hydrated glass of this example can also be utilized for optical applications from the standpoint of homogeneity of the alkali content.

EXAMPLE I

An optical lens was prepared as follows and then measured for surface roughness, durability, and light transmissivity as indicated.

The base (anhydrous) glass ribbon described above was, on an analyzed wt. basis, found to consist of 74.0% $SiO_2$, 10.3% $Na_2O$, 4.55% $K_2O$, 9.13% ZnO, and 2.15% $Al_2O_3$. This corresponds on a mole % basis of 78% $SiO_2$, 10.5% $Na_2O$, 3.1% $K_2O$, 7.1% ZnO, and 1.3% $Al_2O_3$.

Hydration Step

Separate 4 inch portions of the glass ribbon were acid hydrated in three solutions having varying concentrations of $HNO_3$ and, in one case, an indicated amount of $Pb(NO_3)_2$. The hydration steps were performed in an autoclave at 270° C. for 16 hours. The ribbon samples were acid hydrated separately in the following solutions:

5 ml. $HNO_3$ in 100 ml. $H_2O$
20 ml. $HNO_3$ in 100 ml. $H_2O$
25 g $Pb(NO_3)_2$ in 1 ml. $HNO_3$ in 100 ml. $H_2O$

The glass ribbon samples hydrated according to the above methods (acid hydration at pH of less than about 4.0) were somewhat deficient in alkali when compared with the anhydrous base glass. This is shown in the comparative analyses of Table III.

TABLE III

| | Chemical Analysis (in moles where $SiO_2 = 1$) | | | |
|---|---|---|---|---|
| | | Hydrated Glasses | | |
| | Starting Composition (anhydrous) | 25 g $Pb(NO_3)_2$ 1 ml. $HNO_3$ 100 ml. $H_2O$ | 5 ml. $HNO_3$ 100 ml. $H_2O$ | 20 ml. $HNO_3$ 100 ml. $H_2O$ |
| $SiO_2$ | 1.0000 | 1.0000 | 1.0000 | 1.0000 |
| $Na_2O$ | 0.1349 | 0.1225 | 0.09623 | 0.1156 |
| $K_2O$ | 0.0392 | 0.0390 | 0.03424 | 0.0369 |
| ZnO | 0.0911 | 0.0920 | 0.08345 | 0.0904 |
| $Al_2O_3$ | 0.0171 | 0.0169 | 0.0169 | 0.0179 |
| $H_2O$ | — | 0.311 | 0.557 | 0.529 |

HF Wash Treatment

The ribbon which had been hydrated in the $Pb(NO_3)_2/HNO_3$ acid solution was washed in a $HF/H_2SO_4$ solution consisting of equal volumes of HF, $H_2SO_4$ and $H_2O$. Up to about 30% by weight of the glass may be removed. In this case, about 25 wt. % of the ribbon was removed by the HF treatment. The wash was for 1 min. at 25° C.

Molding of Lenses

After the HF wash, the hydrated glass is partially dehydrated to about 5.5% by weight $H_2O$. In a preferred embodiment, the hydrated ribbon was dehydrated to that water content by placing it in an oven at 130° C. for 30 minutes. From the hydrated-partially dehydrated glass ribbon, several one-inch discs were cut out. Five of the discs were then stacked and placed in the mold. The mold used is illustrated cross sectionally in FIG. 4. The overall mold 1 consists of a cylindrical steel housing 3 surrounded by a cylindrical furnace 5 having a cylindrical internal heating chamber 7 into which the mold housing 3 is inserted. Within mold housing 3 there is a cylindrical compression chamber 9 into which the glass discs 10 are placed. The housing 3 also houses a piston 11 and a circular steel base plate 13. To avoid water loss during molding the base plate 13 and piston 11 facing the molding chambers are coated with fluorocarbon discs 15 which are in contact with the non-molding portions of two circular tungsten carbide dies 17. In the example below, only one face of each die 17 was actually polished to achieve an optically smooth surface. Between the dies 17 were placed 5 circular glass discs 10 cut from the treated ribbon. Temperature is monitored with a conventional thermal couple 19 which passes through a press 21 which, in operation exerts downward pressure against the piston 11.

Once the discs 10 are placed in the compression chamber 9 between the surfaces of the dies 17 and the press 21 is in place, rapid heating (about 80° C./min) from room temperature to about 375° C. is carried out and then a pressure of about 10,000 psi is applied via the piston 11 while holding the temperature at about 375° C. for 5 minutes. Then, the molded article is cooled to about 250° C. over a 5 minute period and the pressure is released.

Properties of the Molded Lens

Durability

The chemical durability of the lens prepared as described above was determined using American Optical Stability Test 5.2.0.0.6. The sample showed no appearance change during the test and lost 0.0044 mg/cm², an order of magnitude better than the standard set for ophthalmic lenses.

Transmission of Visible Light

The optical transmission of a typical disc in the visible range was determined by using a Perkin-Elmer Model No. 350 Spectrophotometer. In Table IV, the percent transmittance at 4 arbitrarily chosen wavelengths spanning the visible region of the molded lens (not polished) is compared with a similar disc pressed using mica as a mold release and then ground and polished by conventional methods. As can be seen, the molded lens shows a percent transmittance substantially identical to that of the polished lens.

TABLE IV

Visible Spectra For Samples Molded at 370° C.
Held 5 Minutes, Then Cooled

| Wavelength (nm) | Transmittance (%) Ground and Polished | Not Ground Or Polished |
|---|---|---|
| 350 | 84 | 83.5 |
| 400 | 86 | 86 |
| 500 | 88 | 87 |
| 700 | 90 | 89.5 |

Surface Smoothness

The surface roughness of both the die and the molded lens which was not ground or polished are shown in magnified form in FIGS. 5 and 6, respectively, which illustrates the surface smoothness determinations found using a Gould Surfanalyzer. The horizontal gridlines represent a distance of 0.1 inches. The vertical gridlines represent a height of 1.0 microinches. The surface smoothness measurements (Roughness Height) were made with a Gould Surfanalyzer Model 1200, using a 200 mg probe and a diamond tip stylus having a radius of 0.0005 inch. The instrument was calibrated with manufacturer's standards to a roughness of 125 inches.

EXAMPLE II

A glass lens was similarly molded using another preferred composition (Corning Code 8423 glass), the anhydrous glass of which comprises, in mole percent on the oxide basis, 77.7% $SiO_2$, 6.7% $K_2O$, 4.5% $Na_2O$, 1.5% $Al_2O_3$ and 9.6% PbO. The glass was formed into ribbon from which 1 inch discs (1 mm thick) were cut. The discs were autoclaved in a solution consisting of 20 mls of acetic acid in 100 ml $H_2O$ at 270° C. for 20 hours. The samples were hydrated to 6 wt.% $H_2O$ content by the above process. The samples were then etched in an equimolar $HF-HNO_3$-containing solution to remove approximately 20 wt.% of the glass. The hydrated and etched (but not dehydrated) disc was then placed in the above-described tungsten carbide mold and rapidly heated to 275° C. and subjected to a 10,000 psi pressure. The glass temperature reached 285° C. where it was held for 5 minutes. The sample was cooled to below 175° C. before being removed. In this example, the upper temperature appeared to be important to ±10° C. In other moldings with this glass composition, it was found that if the temperature was held at 270° C. or less, the samples did not replicate the entire die surface. Above about 300° C. the samples had undesirable bubbles in the bulk of the glass body. A preferred die consists of tungsten carbide. When a stainless steel (e.g. Hastelloy Alloy C) was used with a lead-containing glass, it was noted that a black film appeared on the surface although the surface smoothness of the glass was comparable to the WC-molded glass.

Inasmuch as the above described disclosure is subject to numerous variations known to those skilled in the art, it is intended that the disclosed examples be construed as illustrative only and that the invention be limited only by the claims.

I claim:

1. A method of making an optical article comprising the steps of:

a. forming a glass comprising, in mole percent on an oxide basis, about 70 to 80% $SiO_2$, 8–18% $Na_2O$ and/or $K_2O$, and about 5 to 10% of a member selected from PbO, ZnO, and mixtures thereof;

b. hydrating the glass under acidic conditions to include in the glass a water content from 3% to 12% by weight thereby resulting in an undesirable alkali concentration gradient in the glass from the surface inwardly c. reacting the hydrated glass of step (b) with an HF-containing solution under conditions sufficient to remove alkali concentration gradients resulting from step (b) in the glass by removing up to 30 weight percent of the glass;

d. dehydrating the glass, if necessary, to reduce the water content to a range of 3 to 7 weight percent; and e. pressure molding the glass at a temperature ranging from about 250° to 450° C. and at a pressure ranging from about 5,000 to 13,000 psi against a die having a molding surface smoothness such that, over a distance of at least 0.1 inch, the Roughness Height, on an arithmetic average basis, is less than about 3.0 microinches, the molding being under conditions sufficient to impart to the glass the surface smoothness characteristics of the die.

2. The method of claim 1 wherein the surface smoothness of the die molding surface is such that over a distance of at least 0.1, the Roughness Height, on an arithmetic average basis, is less than 1.6 microinches.

3. The method of claim 1 wherein the acidic hydration of step (b) is at a pH of less than about 4.0.

4. The method of claim 1 wherein the HF-containing solution of step (c) includes at least one acid selected from the group consisting of $H_2SO_4$ and $HNO_3$.

5. The method of claim 1 wherein the dehydration of step (d) is accomplished by placing the glass in an oven at a temperature ranging from about 100° to 250° C.

6. The method of claim 1, wherein the temperature of step (e) ranges from 350° to 425° C.

7. The method of claim 1 wherein the die used in step (e) comprises tungsten carbide.

8. The method of claim 1 wherein the glass of step (a) comprises, in mole percent on the oxide basis, about 77.1% $SiO_2$, 10.8% $Na_2O$, 3.0% $K_2O$, 7.8% ZnO, and 1.3% $Al_2O_3$.

9. The method of claim 1 wherein the glass of step (a) comprises in mole percent on the oxide basis, about 77.7% $SiO_2$, 6.7% $K_2O$, 4.5% $Na_2O$, 1.5% $Al_2O_3$, and 9.6% PbO.

10. The method of claim 1 wherein the glass of step (a) includes up to about 5 mole % $Al_2O_3$.

11. The method of claim 1 wherein the glass of step (a) includes up to about 3 mole % of $B_2O_3$ or $P_2O_5$.

12. The method of claim 1 wherein the glass of step (a) includes up to 5 mole % of at least one member selected from BaO, MgO, and SrO.

13. A method of making an optical lens comprising the steps of:

a. forming a glass comprising, in mole percent on an oxide basis, about 70 to 80% $SiO_2$, 8–18% $Na_2O$ and/or $K_2O$, and about 5 to 10% of a member selected from PbO, ZnO,, and mixtures thereof;

b. hydrating the glass under acidic conditions to include in the glass a water content from 3% to 12% by weight thereby resulting in an undesirable alkali concentraton gradient in the glass from the surface inwardly;

c. reacting the hydrated glass of step (b) with an HF-containing solution under conditions sufficient to remove alkali concentration gradients resulting from step (b) in the glass by removing up to 30 wt.% of the glass;

d. dehydrating the glass, if necessary, to reduce the water content to a range of 3 to 7 weight percent; and e. pressure molding the glass at a temperature ranging from about 250° to 450° C. and at a pressure ranging from about 5,000 to 13,000 psi between die surfaces, each having a molding surface smoothness such that, over a distance of at least 0.1 inch, the Roughness Height, on an arithmetic average basis, is less than about 3.0 microinches, the molding being under conditions sufficient to form a glass lens having surface smoothness characteristics substantially similar to the die surfaces.

14. The method of claim 13 wherein the acid hydration of step (b) is at a pH of less than about 4.0.

15. The method of claim 13 wherein the HF-containing solution of step (c) includes at least one acid selected from the group consisting of $H_2SO_4$ and $HNO_3$.

16. The method of claim 13 wherein the die of step (e) comprises tungsten carbide.

17. The method of claim 13 wherein the glass of step (a) comprises, in mole percent on the oxide basis, about 77.1% $SiO_2$, 10.8% $Na_2O$, 3.0% $K_2O$, 7.8% ZnO, and 1.3% $Al_2O_3$.

18. The method of claim 13 wherein the glass of step (a) comprises, in mole percent on the oxide basis, about 77.7% $SiO_2$, 6.7% $K_2O$, 4.5% $Na_2O$, 1.5% $Al_2O_3$, and 9.6% PbO.

19. The method of claim 13 wherein the glass of step (a) includes up to about 5 mole % $Al_2O_3$.

20. The method of claim 13 wherin the glass of step (a) includes up to about 3 mole % of $B_2O_3$ or $P_2O_5$.

21. The method of claim 13 wherein the glass of step (a) includes up to 5 mole % of at least one member selected from the group consisting of BaO, MgO, and SrO.

22. The method of claim 13 wherein the glass of step (e) is in the form of a disc having a diameter about equal to the diameter of the lens being molded.

* * * * *

UNITED STATES PATENT AND TRADEMARK OFFICE
CERTIFICATE OF CORRECTION

PATENT NO. : 4,026,692

DATED : May 31, 1977

INVENTOR(S) : Roger F. Bartholomew

It is certified that error appears in the above-identified patent and that said Letters Patent are hereby corrected as shown below:

Column 1, line 31, after "microinches" insert --(16μ") --.

Column 1, line 32, after "inches," insert -- (30μ") --.

Column 1, line 34, after "3.0" insert -- μ" --.

Column 2, line 8, after "microinches" insert -- (3.0μ") --.

Column 2, line 10, after "microinches" insert -- (1.6μ") --.

Column 2, line 12, "(16 to 30)" should be -- (16 to 30 μ") --.

Column 8, line 25, delete "inches" and insert -- μ" --.

Signed and Sealed this

Eleventh Day of October 1977

[SEAL]

Attest:

RUTH C. MASON
Attesting Officer

LUTRELLE F. PARKER
Acting Commissioner of Patents and Trademarks